US012116832B2

(12) United States Patent
Shabani et al.

(10) Patent No.: US 12,116,832 B2
(45) Date of Patent: Oct. 15, 2024

(54) MULTI-PANE INSULATED GLASS UNIT HAVING A RELAXED FILM FORMING A THIRD PANE AND METHOD OF MAKING THE SAME

(71) Applicant: Vitro Flat Glass LLC, Cheswick, PA (US)

(72) Inventors: Roxana Shabani, Gibsonia, PA (US); James W. McCamy, Export, PA (US); William Davis, II, Fombell, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 47 days.

(21) Appl. No.: 17/670,859

(22) Filed: Feb. 14, 2022

(65) Prior Publication Data

US 2022/0259917 A1 Aug. 18, 2022

Related U.S. Application Data

(60) Provisional application No. 63/150,222, filed on Feb. 17, 2021.

(51) Int. Cl.
*E06B 3/66* (2006.01)
*E06B 3/663* (2006.01)
(Continued)

(52) U.S. Cl.
CPC ...... *E06B 3/66366* (2013.01); *E06B 3/66352* (2013.01); *E06B 3/6715* (2013.01); *E06B 3/67326* (2013.01)

(58) Field of Classification Search
CPC ............. E06B 3/66366; E06B 3/66352; E06B 3/6715; E06B 3/67326; E06B 3/6612;
(Continued)

(56) References Cited

U.S. PATENT DOCUMENTS 2,684,266 A * 7/1954 Englehart ........... E06B 3/66314 239/34
2,838,809 A * 6/1958 Zeolla ..................... E06B 3/677 96/108

(Continued)

FOREIGN PATENT DOCUMENTS

CA 1226802 9/1987
CA 2847741 A1 9/2014

(Continued)

OTHER PUBLICATIONS

Selkowitz et al., United States Statutory Invention Registration No. H975; Nov. 5, 1991.

*Primary Examiner* — Ryan D Kwiecinski
(74) *Attorney, Agent, or Firm* — The Webb Law Firm

(57) ABSTRACT

An insulating glass unit and a method of forming same comprising a pair of glass panes in a parallel, spaced apart relation, at least one edge spacer and at least a primary sealant located between adjacent edges of the pair of panes to provide an integral sealed unit defining a space therebetween, and at least one transparent film located within the space between the pair of glass panes, the at least one transparent film secured to one of a support structure and the at least one edge spacer, wherein the film is positioned in a spaced apart parallel relationship between the pair of glass panes, and wherein the film is annealed to a relaxed state prior to positioning of the film between the pair of glass panes.

20 Claims, 12 Drawing Sheets

(51) Int. Cl.
*E06B 3/67* (2006.01)
*E06B 3/673* (2006.01)

(58) Field of Classification Search
CPC .... E06B 3/66; E06B 3/66309; E06B 3/66314; E06B 3/66342; E06B 3/6733
See application file for complete search history.

(56) References Cited

U.S. PATENT DOCUMENTS

| | | | | | |
|---|---|---|---|---|---|
| 4,319,623 | A | | 3/1982 | Krogseng et al. | |
| 4,335,166 | A | * | 6/1982 | Lizardo | E06B 3/6715 156/107 |
| 4,432,174 | A | * | 2/1984 | Grether | E06B 3/6715 160/371 |
| 4,468,905 | A | | 9/1984 | Cribben | |
| 4,520,611 | A | | 6/1985 | Shingu et al. | |
| 4,536,424 | A | * | 8/1985 | Laurent | E06B 3/6715 156/107 |
| 4,581,282 | A | | 4/1986 | Higgins et al. | |
| 4,799,745 | A | | 1/1989 | Meyer et al. | |
| 4,853,264 | A | * | 8/1989 | Vincent | E06B 3/6715 428/458 |
| 4,950,344 | A | | 8/1990 | Glover et al. | |
| 4,994,309 | A | * | 2/1991 | Reichert | E06B 3/66357 52/204.593 |
| 5,007,217 | A | | 4/1991 | Glover et al. | |
| 5,156,894 | A | * | 10/1992 | Hood | E06B 3/66323 52/786.13 |
| 5,439,716 | A | * | 8/1995 | Larsen | E06B 3/66314 52/786.13 |
| 5,491,953 | A | | 2/1996 | Lafond | |
| 5,544,465 | A | * | 8/1996 | Hood | E04C 2/54 52/786.13 |
| 5,983,593 | A | * | 11/1999 | Carbary | E06B 3/6715 52/204.593 |
| 6,002,521 | A | | 12/1999 | Town | |
| 6,131,364 | A | * | 10/2000 | Peterson | E06B 3/66323 52/786.13 |
| 6,568,873 | B1 | * | 5/2003 | Peterson | E06B 3/667 403/301 |
| 7,571,583 | B2 | * | 8/2009 | Winfield | E06B 3/66319 52/786.13 |
| 8,474,198 | B2 | | 7/2013 | Neple et al. | |
| 8,530,011 | B2 | | 9/2013 | Kleinhempel et al. | |
| 8,551,594 | B2 | | 10/2013 | Deiss | |
| 8,596,024 | B2 | | 12/2013 | Trpkovski | |
| 8,728,636 | B2 | | 5/2014 | Kleinhempel et al. | |
| 9,228,389 | B2 | | 1/2016 | Heikkila et al. | |
| 9,739,085 | B2 | | 8/2017 | Kuster et al. | |
| 10,125,537 | B2 | | 11/2018 | Clarahan | |
| 10,301,868 | B2 | | 5/2019 | Kuster et al. | |
| 10,359,681 | B2 | * | 7/2019 | Brown | B32B 17/10055 |
| 10,370,894 | B2 | | 8/2019 | Kuster et al. | |
| 2011/0133940 | A1 | | 6/2011 | Margalit | |
| 2014/0023802 | A1 | | 1/2014 | Margalit | |
| 2014/0261974 | A1 | * | 9/2014 | Wipfler | F27B 9/12 156/107 |
| 2014/0290156 | A1 | * | 10/2014 | Bruce | E06B 3/677 52/204.593 |
| 2014/0326126 | A1 | * | 11/2014 | Hay, III | E06B 5/10 89/36.04 |
| 2017/0247935 | A1 | * | 8/2017 | Dobrovolny | E06B 3/677 |
| 2019/0277081 | A1 | | 9/2019 | Schreiber et al. | |
| 2019/0284868 | A1 | * | 9/2019 | Schweitzer | C03C 17/3681 |
| 2020/0056422 | A1 | | 2/2020 | Kuster et al. | |
| 2023/0024066 | A1 | * | 1/2023 | Ruocco | C08F 210/16 |
| 2023/0219272 | A1 | * | 7/2023 | Molnar | B32B 27/30 428/220 |

FOREIGN PATENT DOCUMENTS

| | | | | | |
|---|---|---|---|---|---|
| CN | 106968564 | A | | 2/2015 | |
| DE | 19654107 | A1 | * | 6/1998 | E06B 3/66366 |
| EP | 0819817 | A2 | | 1/1998 | |
| EP | 2594721 | A2 | * | 5/2013 | E06B 3/66366 |
| GB | 2144475 | A | * | 3/1985 | E06B 3/66366 |
| JP | WO2015025679 | A1 | | 3/2017 | |
| TW | 201641551 | A | * | 12/2016 | B29C 55/005 |
| WO | 8906734 | A1 | | 7/1989 | |
| WO | 2012097218 | A1 | | 7/2012 | |
| WO | WO-2014193642 | A1 | * | 12/2014 | E06B 3/6612 |
| WO | 2016029891 | A1 | | 3/2016 | |
| WO | WO-2019174914 | A1 | * | 9/2019 | |

* cited by examiner

MULTI-PANE INSULATED GLASS UNIT HAVING A RELAXED FILM FORMING A THIRD PANE AND METHOD OF MAKING THE SAME

CROSS-REFERENCE TO RELATED APPLICATION

This application claims priority to Provisional Application No. 63/150,222, filed Feb. 17, 2021, which is herein incorporated by reference in its entirety.

BACKGROUND OF THE INVENTION

Field of the Invention

The invention relates to a multi-pane insulated glass unit having a third pane formed from a relaxed film supported by a either a flexible frame or an edge spacer and a method for its production.

Description of Related Art

Insulated glass units having a third pane, or even more panes, in the form of a plastic sheet or a multi-layer film supported between a pair of glass panes is known. The glass panes are connected to one another via at least one circumferential spacer, at least a primary sealant, and a secondary sealant provided along the edges of the glass panes. The third pane creates a space between each of the glass panes which can be filled with air or gas to reduce heat conductance across the window structure. Any inert, low heat transfer gas may be used, including krypton, argon, sulfur hexafluoride, carbon dioxide or the like. This filling gas can contain some appreciable amount of oxygen to prevent or minimize yellowing of the interior plastic third pane. One example of an insulated glass unit, is illustrated in FIG. 1. In this design, the third pane comprises low-e coated PET film, which is a high-cost component. The third pane is secured to the circumferential spacer, the primary sealant, and the secondary sealant. This process requires at least the secondary sealant to be fully heat cured first to support the film during the heated wrinkle removal step. A fully assembled unit results in a very inefficient transfer of heat to the film, which requires 2-4 hours, typically closer to 4 hours, to assemble. In addition to the long assembly time, one of the main disadvantages of this design is that the film often wrinkles, which, because the film is fully integrated into the system, the entire unit must be discarded. Even when the film is attached to the spacer, any skew of the unit during transport or service, even if no leaks occur, will result in wrinkling of the film. In designs that include multiple middle panes, additional interfaces between the middle panes, primary sealant, and secondary sealant are necessary, which increase the risk of air ingress.

Many of the prior art insulated glass units having two panels can do no better than R5 thermal performance.

There is a need in the art for an insulated glass unit that can be easily assembled in a short amount of time wherein the occurrence of wrinkling of the third pane has been minimized. There is also a need in the art for an insulated glass unit that allows for the presence of additional middle panes without the creation of additional interfaces.

SUMMARY OF THE INVENTION

In accordance with one aspect, the present disclosure is directed to an insulating glass unit comprising a pair of glass panes in a parallel, spaced apart relation, at least one edge spacer and at least a primary sealant located between adjacent edges of the pair of panes to provide an integral sealed unit defining a space therebetween, and at least one transparent film located within the space between the pair of glass panes. The at least one transparent film is secured to one of a support structure and the at least one edge spacer such that the film is positioned in a spaced apart parallel relationship between the pair of glass panes. The film is annealed by the application of heat thereto for a predetermined time to a relaxed state prior to positioning of the film between the pair of glass panes.

The at least one transparent film is supported by the support structure or the edge spacer. According to one embodiment, the film can be secured directly to the edge spacer. According to another embodiment, the film can be secured to the support structure wherein the support structure comprises at least one frame member located adjacent an edge of the film. This at least one frame member can be flexible and have a thickness large enough so it would not lose its shape under its weight. According to one embodiment, a 1/16" thick aluminum frame can be used. According to another embodiment, the support structure can comprise a pair of frame members sandwiching an edge of the film.

The film can be annealed prior to or after securing the film to the support structure. The film is annealed to a relaxed state wherein the relaxed state of the film has a tension of less than or equal to 0.1 lb. per linear inch.

Depending upon the type of film being used, the film is heated to a certain annealing temperature as to cause stress induced crystallization of the film. According to one embodiment, the film can be heated to an annealing temperature of at least 70° C. for approximately ten minutes.

The film can comprise at least one of a polymeric sheet, a thin glass sheet, and/or any other transparent sheet. According to one embodiment, the film can be a polymeric sheet comprising polyethylene terephthalate (PET). The film can also include more materials embedded therein or coated on one or both sides to control transmission and/or reflection spectra. At least one surface of the film can include a low-e coating. The film can also be configured to act as a sound generating membrane.

The film can be secured to the support structure or the at least one edge spacer by at least one of a mechanical member, an adhesive, and a thermoplastic welding process. The support structure can be secured to the edge spacer.

According to one embodiment, the pair of glass panes can comprise a first glass pane and a second glass pane and the support structure can be configured to allow for a gas to travel between a first chamber located between the first glass pane and a first side of the film and a second chamber located between the second glass pane and a second side of the film to ensure pressure equalization between the first chamber and the second chamber.

In accordance with another aspect, the present disclosure is directed to a method for forming an insulating glass unit comprising providing a pair of glass panes in a parallel, spaced apart relation, providing at least one film, stretching the film to remove wrinkles, securing the film to one of a support structure and at least one edge spacer, applying heat to the film to anneal the film to a relaxed state, wherein the step of annealing the film occurs before or after the step of securing the film to one of the support structure and the at least one edge spacer, positioning the film secured to the support structure between the pair of glass panes such that the film and support structure are positioned in a spaced apart parallel relationship between the pair of glass panes, and providing the at least one edge spacer and a primary sealant between adjacent edges of the pair of panes to provide an integral sealed unit defining a space therebetween.

According to one embodiment, the film can be secured directly to the at least one edge spacer. Alternatively, the film can be secured to the support structure and the film and support structure are positioned between the pair of glass panes at a location that is separate from the at least one edge spacer.

The support structure can comprise at least one flexible frame member located adjacent an edge of the film or a pair of flexible frame members sandwiching an edge of the film. According to one embodiment, the support structure can comprise at least one frame member located adjacent an edge of the film, wherein the at least one frame member is flexible and has a thickness large enough so it would not lose its shape under its weight. According to one embodiment, an approximate 1/16" thick aluminum frame can be used.

The film can be heated to a temperature and for a time sufficient to cause stress induced crystallization such that the relaxed state of the film has a tension of less than or equal to 0.1 lb. per linear inch.

The method further comprises trimming the film after it is annealed to the relaxed state and secured to one of the support structure and the at least one edge spacer. The film can be secured to one of the support structure and the at least one edge spacer by at least one of a mechanical member, an adhesive, and or a thermoplastic welding process.

Use of the divider polymer film of the present invention having a low thermal mass can reach the wrinkle removal temperature in less than an hour or even less time, such as less than a second, as compared with a total prior art wrinkle removal time of 2-4 hours. The present invention also allows for permutations with respect to various combinations of glass thickness, low-e coating and locations of those coating in the unit. This allows the fabricator to tailor the design to give the desired cost/performance tradeoff for a given building, geographic region, or code requirements. Supporting the center divider or third pane on a separate structure allows for the off-set of the divider from the centerline of the unit more easily than the prior art. This allows for placement/addition of muntins more easily while still improving the thermal performance. Also, unlike the prior art wherein the middle pane is integrated into the unit, the system of the present invention can be separated into sub-components for assembly. This allows for improved yield of the final system by allowing for disposal of out-of-specification parts early in the process. Also, it is much easier to include multiple middle panels or panes in the unit.

BRIEF DESCRIPTION OF THE DRAWINGS

The invention is illustrated in the accompanying drawing figures wherein like reference characters identify like parts throughout. Unless indicated to the contrary, the drawing figures are not to scale.

DESCRIPTION OF THE INVENTION

Figure 1:
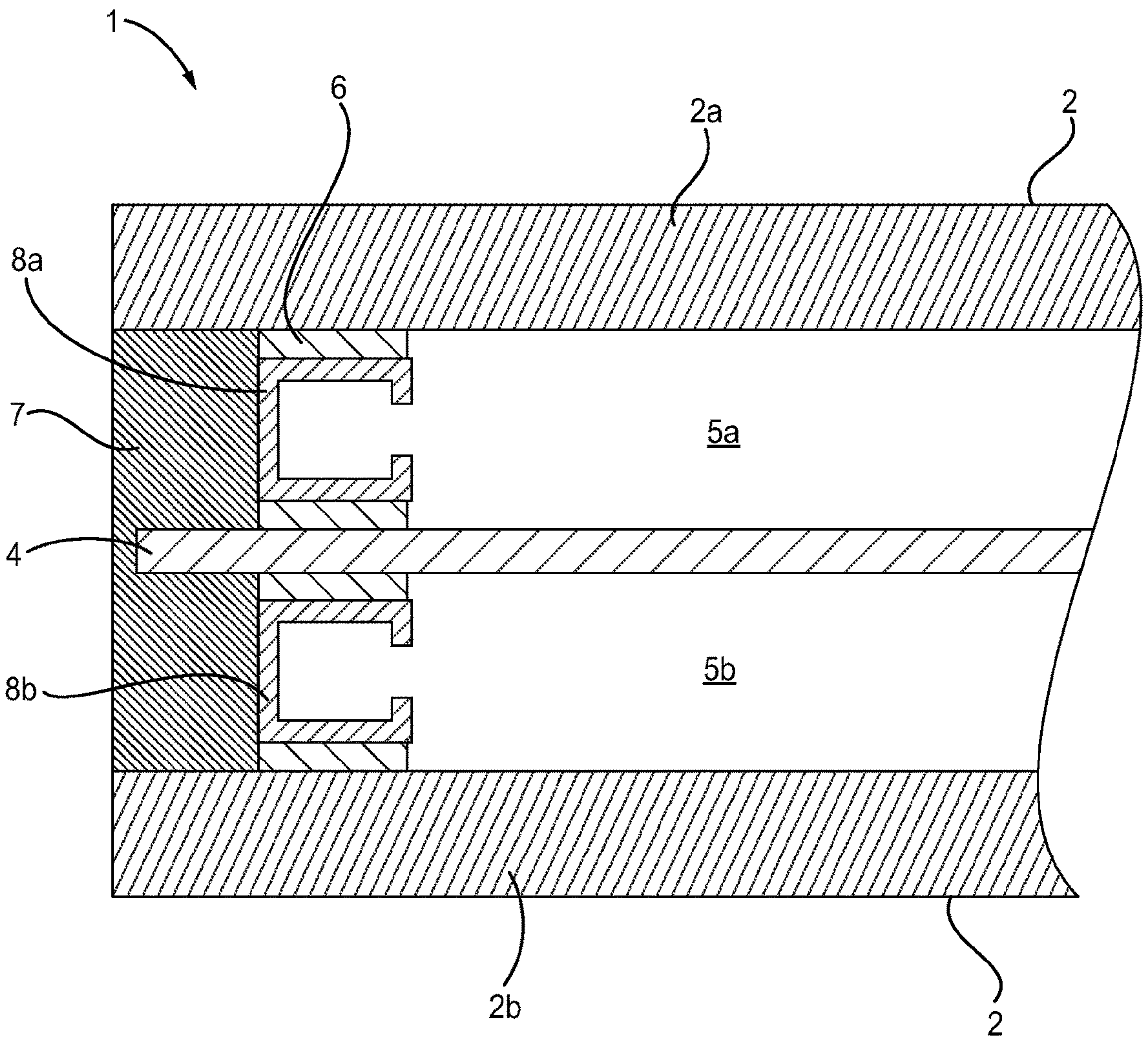
PRIOR ART FIG. 1
FIG. 1 is a cross-sectional side view of a multi-pane insulated glass unit in accordance with the prior art.

Spatial or directional terms used herein, such as "left", "right", "upper", "lower", and the like, relate to the invention as it is shown in the drawing figures. It is to be understood that the invention can assume various alternative orientations and, accordingly, such terms are not to be considered as limiting.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Additionally, all documents, such as but not limited to, issued patents and patent applications, referred to herein are to be considered to be "incorporated by reference" in their entirety.

All numbers used in the specification and claims are to be understood as being modified in all instances by the term "about". All ranges disclosed herein are to be understood to encompass the beginning and ending range values and any and all subranges subsumed therein. The ranges set forth herein represent the average values over the specified range.

All documents referred to herein are to be considered to be "incorporated by reference" in their entirety.

Any reference to amounts, unless otherwise specified, is "by weight percent".

The discussion of the invention herein may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of this disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

Reference is now made to FIG. 1, which shows a cross-sectional side view of a multi-pane insulated glass unit, generally indicated as 1, in accordance with the prior art. The unit 1 includes a pair of glass panes 2*a*, 2*b* in a parallel, spaced apart relation. A third pane, in form of a coated film 4, is positioned between the panes 2*a*, 2*b*, creating open spaces or chambers 5*a*, 5*b* between the panes 2*a*, 2*b* and the film 4. The film 4 is secured to edge spacers 8*a*, 8*b* with a primary sealant 6. The edge spacers 8*a*, 8*b* extend generally about the periphery of their respective panes 2*a*, 2*b*. The edge spacers 8*a*, 8*b* are of identical dimensions in cross-section so that the film 4 is positioned midway between the opposing panes 2*a*, 2*b*. The edge spacers 8*a*, 8*b* can be shaped such that when the panes 2*a*, 2*b* are attached to the edge spacers 8*a*, 8*b*, the panes 2*a*, 2*b* are parallel to each other and to the film 4. A secondary sealant 7 is provided to further secure the film 4 and within the unit 1. The process for making the glass unit 1 of the prior art includes the steps of assembling the entire unit, including the panes 2*a*, 2*b*, the film 4, edge spacers 8*a*, 8*b*, primary sealant 6, secondary sealant 7, curing the sealants, which can take up to 2 hours, shrinking the film 4 in an oven, which can take an additional 2 more hours, then manually filling the spaces 5*a*, 5*b* with an inert gas, such as argon.

In the prior art design, the use of the edge spacers 8*a*, 8*b* sandwiching the center film 4, forms two interfaces with the primary sealant material 6, which is further extended outward to be gripped by the secondary sealant 7, with provides the mechanical support. This can result in the application of shear stress on the seal, which may raise the potential for seal failure. Also, these two additional interfaces result in additional failure points for air ingress which can degrade the thermal performance of the unit 1. Additionally, the time to construct the unit 1 can take several hours, anywhere from 3-5 hours, or more.

Figure 2:
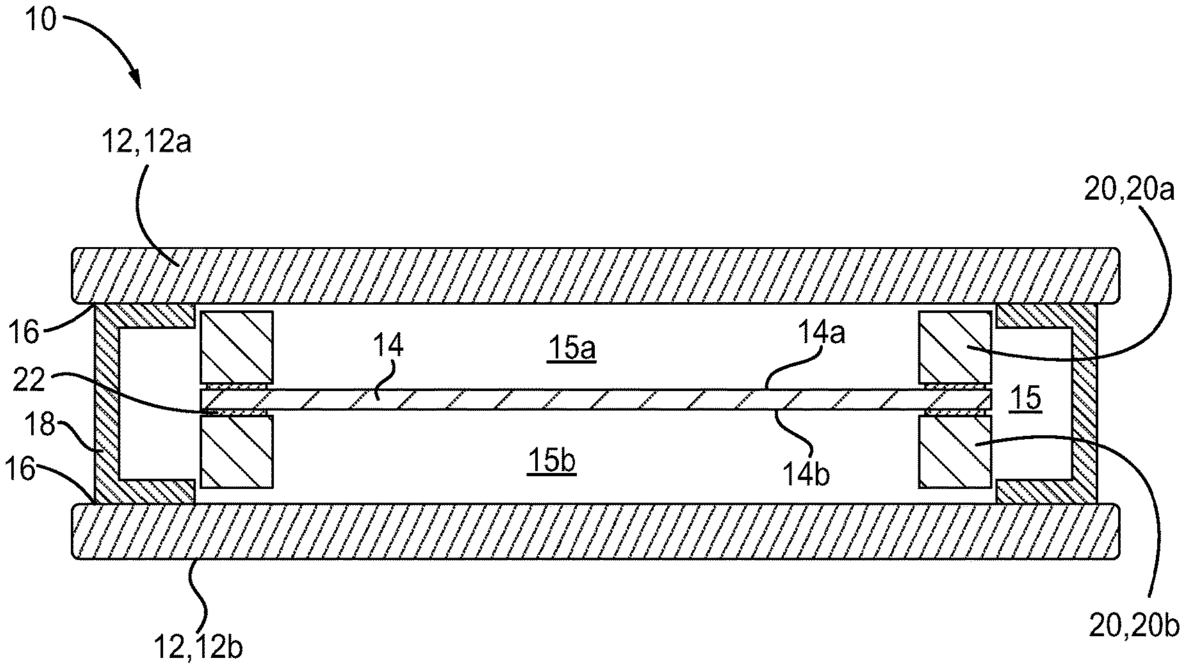
FIG. 2 is a cross-sectional side view of a multi-pane insulated glass unit in accordance with an embodiment of the invention.
Figure 3:
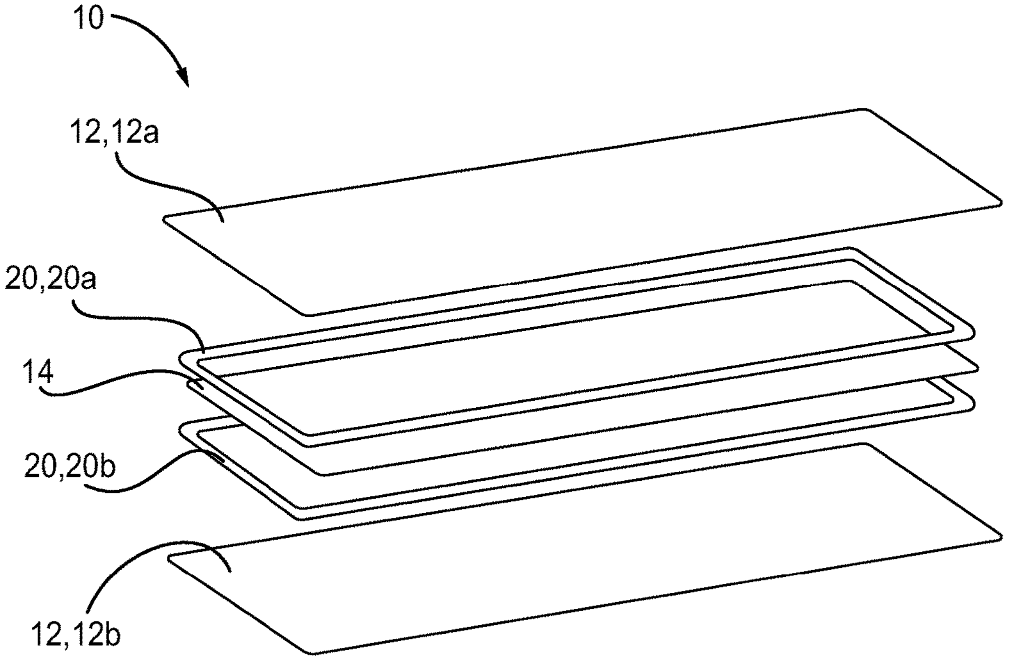
FIG. 3 is an expanded side perspective view of a portion of the multi-pane insulated glass unit of FIG. 2 in accordance with an embodiment of the invention.

Reference is now made to FIGS. 2-3, which show the multi-pane insulated glass unit, generally indicated as 10, in accordance with an embodiment of the present invention. The unit 10 includes a pair of glass panes 12*a*, 12*b* in a parallel, spaced apart relation. At least one edge spacer 18 is provided between the glass panes 12*a*, 12*b*. A first or primary sealant 16 is located between adjacent edges of the pair of panes 12*a*, 12*b* to provide an integral sealed unit defining a space 15 therebetween. At least one transparent film 14 is located within the space 15 between the pair of glass panes 12*a*, 12*b*. The at least one transparent film 14 is secured to one of a support structure 20, as shown in FIGS. 2, 3, and 4A-4C, or the at least one edge spacer 18, as shown in FIG. 4D, such that the film is positioned in a spaced apart parallel relationship between the pair of glass panes 12*a*, 12*b* to create a pair of spaces 15*a*, 15*b*. The support structure 20 can be a single frame or a pair of frames 20*a*, 20*b*. The spaces 15*a*, 15*b* can be filled with air or gas to reduce heat conductance across the window structure. Any inert, low heat transfer gas may be used, including krypton, argon, sulfur hexafluoride, carbon dioxide or the like. A combination and/or different gases can be used in the spaces 15*a*, 15*b* to obtain a desired reduction of heat conductance. This filling gas can contain some appreciable amount of oxygen to prevent or minimize yellowing of the interior film 14.

The film 14 is annealed prior to positioning of the film 14 between the pair of glass panes 12*a*, 12*b*. Annealing of the film reduces internal stresses in the film, often introduced during manufacture, allowing the film to be more malleable during molding or any further processing and reduces the likelihood of cracking, especially when exposed to temperature fluctuations.

This annealing step releases the tension in the film 14 via stress induced crystallization. This step typically takes a few minutes, depending upon the material used for the film 14 and the temperature at which the film is heated for annealing the film 14.

Depending upon the type of film 14 being used, the film 14 is heated to a certain annealing temperature so as to cause stress induced crystallization of the film 14. If the film is a plastic material, the annealing process can involve heating the film up to half of its melt temperature for a period of time and then cooling the film back down to allow the film to relax. If the film is a metal material, it is typically annealed by heating the metal above its recrystallization temperature, maintaining a suitable temperature for an appropriate amount of time and then cooling. Films formed from glass are subjected to a controlled cooling process, so as to prevent cracking or breaking of the film. According to one embodiment, the film can be heated to an annealing temperature of at least 70° C. for approximately ten minutes. According to other embodiments, the film can be heated to above 110° C., 90° C., or 85° C.

According to the embodiment shown in FIGS. 2, 3, and 4A-4C, the at least one transparent film 14 is supported by the support structure or frame 20. The film 14 can be secured to the support structure or frame, wherein the frame 20 is located adjacent an edge and extending about the periphery of the film 14. This at least one frame 20 can be flexible and have a thickness large enough so it would not lose, but rather maintain, its shape under its weight. According to one embodiment, an approximate 1⁄16" thick aluminum frame can be used. It can be appreciated that the frame can have a thickness that is less than or greater than 1⁄16" depending upon the material used for the frame. According to another embodiment, the support structure can comprise a pair of frames 20*a*, 20*b* sandwiching an edge of the film 14 and extending about the periphery of the film 14.

Figure 4A:
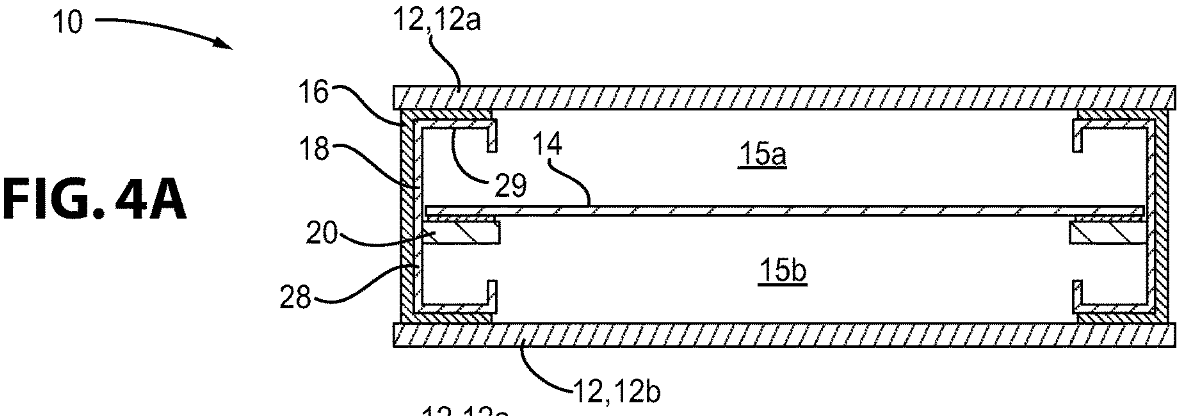
FIGS. 4A-4D are cross-sectional side views of a multi-pane insulated glass unit showing various arrangements for securing the third pane within the glass unit in accordance with embodiments of the invention.

In the FIG. 4A arrangement, a single edge spacer 18 is located between the panes 12*a*, 12*b* and a single frame 20 is provided to support the film 14. The edge spacer 18 can be a C-shaped member having a vertical side portion 28 and horizontal top and bottom portions 29. The edge spacer 18 extends generally about the periphery of panes 12*a*, 12*b*. The frame 20 can be mechanically or adhesively secured to the edge spacer 18 or by any other well-known technique. The frame 20 and film 14 can be located equidistantly between the panes 12*a*, 12*b* so as to create equal spaces 15*a*, 15*b* between the film 14 and the panes 12*a*, 12*b*. Alternatively, the frame 20 and film 14 can be located between the panes 12*a*, 12*b* such that one of the spaces 15*a* or 15*b* is larger than the other of spaces 15*a*, 15*b*. A primary sealant 16 can be used to secure the edge frame 18 to the panes 12*a*, 12 and can extend along the vertical side portion 28 of the edge spacer 18.

Figure 4B:
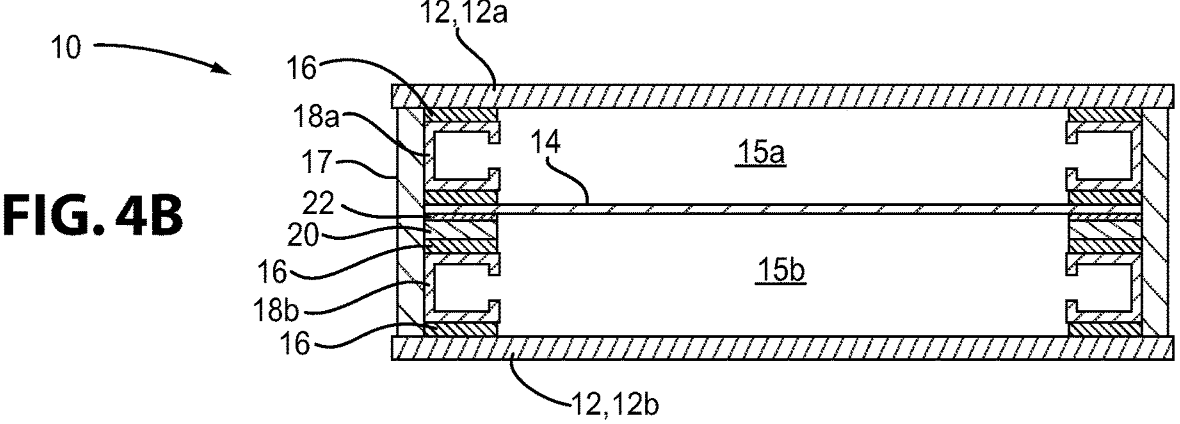

The FIG. 4B arrangement shows a pair of edge spacers 18*a*, 18*b* for supporting the frame 20. In this arrangement, the film 14 is secured to a single frame 20 and the frame 20 is mounted between the edge spacers 18*a*, 18*b* and secured therein with an adhesive 22. The edge spacers 18*a*, 18*b* extend generally about the periphery of their respective panes 12*a*, 12*b*. The edge spacers 18*a*, 18*b* can have identical dimensions in cross-section, however, because the frame 20 is interposed between the spacers 18*a*, 18*b*, the film 14 is not positioned midway between the opposing panes 12*a*, 12*b* and one of the spaces 15*a*, 15*b* is larger than the other of the spaces 15*a*, 15*b*. The edge spacers 18*a*, 18*b* can be shaped such that when the panes 12*a*, 12*b* are attached to the edge spacers 18*a*, 18*b*, the panes 12*a*, 12*b* are parallel to each other and to the film 14. Primary sealant 16 can be positioned between the edge members 18 and the panes 12 and secondary sealant 17 can be provided along the vertical side portion of the spacers 18*a*, 18*b* to seal the unit 10

Figure 4C:
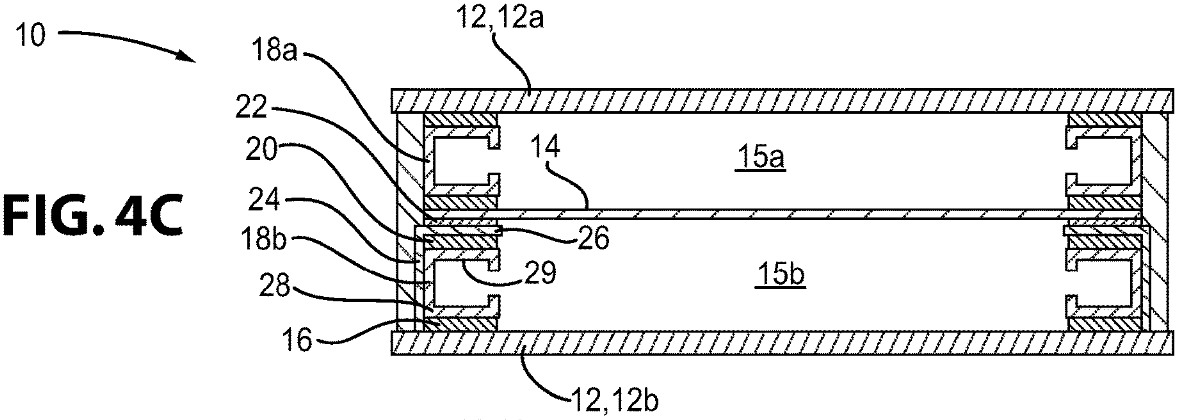
Figure 4D:
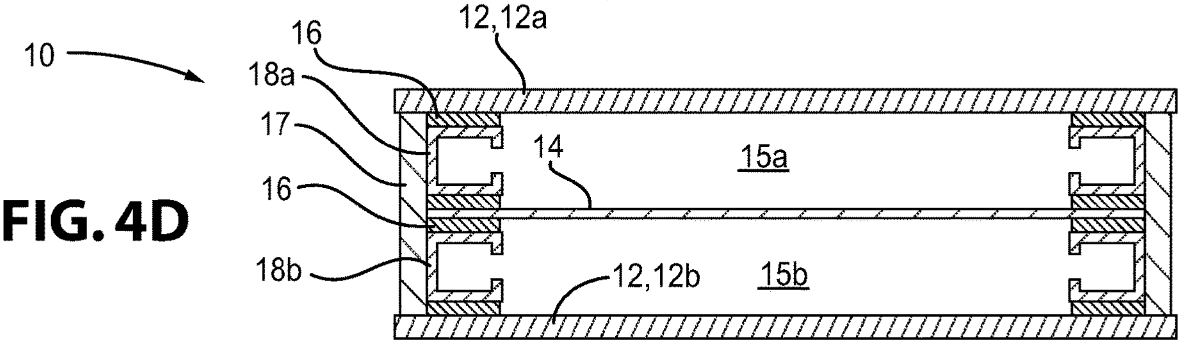

The FIG. 4C arrangement shows a pair of edge spacers 18*a*, 18*b* for supporting the frame 20. This arrangement is similar to the FIG. 4B arrangement in that the film 14 is secured to a single frame 20 and the frame 20 is mounted between the edge spacers 18*a*, 18*b* and secured therein with an adhesive 22. In this arrangement, the frame 20 is thinner and can be shaped, such as in an L-shape having a vertically extending leg 24 positioned adjacent to a vertical side portion 28 of edge spacer 18 and a horizontally extending leg 26 positioned adjacent to a horizontal top portion 29 of edge spacer 18. The edge spacers 18*a*, 18*b* extend generally about the periphery of their respective panes 12*a*, 12*b*. The edge spacers 18*a*, 18*b* can have identical dimensions in cross-section, however, because the horizontal leg 26 of frame 20 is interposed between the spacers 18*a*, 18*b*, the film 14 is not positioned midway between the opposing panes 12*a*, 12*b* and one of the spaces 15*a*, 15*b* is larger than the other of the spaces 15*a*, 15*b*. The edge spacers 18*a*, 18*b* can be shaped such that when the panes 12*a*, 12*b* are attached to the edge spacers 18*a*, 18*b*, the panes 12*a*, 12*b* are parallel to each other and to the film 14. Primary sealant 16 can be positioned between the edge spacers 18*a*, 18*b* and the panes 12*a*, 12*b* and secondary sealant 17 can be provided along the vertical side portion of the spacers 18*a*, 18*b* to seal the unit 10.

According to the embodiment of FIG. 4D, the film 14 can be secured directly to the edge spacers 18*a*, 18*b*. The film 14 can be adhered to the edge spacers 18*a*, 18*b* with first sealant 16 or with a separate adhesive (not shown). The edge spacers 18*a*, 18*b* extend generally about the periphery of their respective panes 12*a*, 12*b*. The edge spacers 18*a*, 18*b* can have identical dimensions in cross-section so that the film 14 is positioned equidistant between the opposing panes 12*a*, 12*b* and the spaces 15*a*, 15*b* are essentially the same size. Alternatively, one of the edge spaces 18*a*, 18*b* can be larger than the other so that the film is not positioned midway between the opposing panes 12*a*, 12 and one of the spaces 15*a*, 15*b* is larger than the other of the spaces 15*a*, 15*b*. The edge spacers 18*a*, 18*b* can be shaped such that when the panes 12*a*, 12*b* are attached to the edge spacers 18*a*, 18*b*, the panes 12*a*, 12*b* are parallel to each other and to the film 14. Primary sealant 16 can be positioned between the edge spacers 18*a*, 18*b* and the panes 12 and secondary sealant 17 can be provided along the vertical side portion of the spacers 18*a*, 18*b* to seal the unit 10.

Figure 5A:
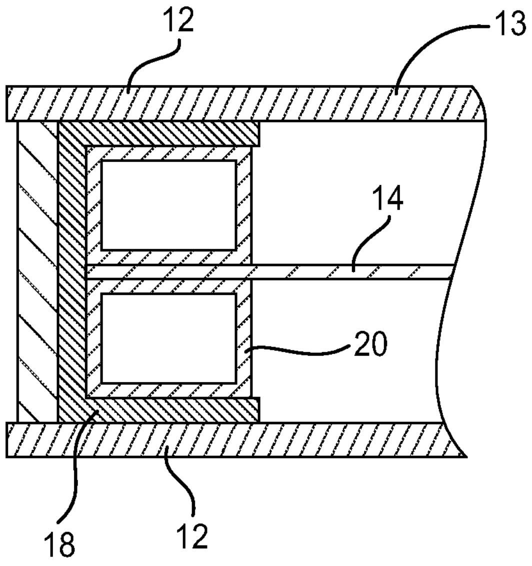
FIGS. 5A-5C are cross-sectional partial views showing various arrangements for mounting the support structure in the multi-pane insulated glass unit.
Figure 5B:
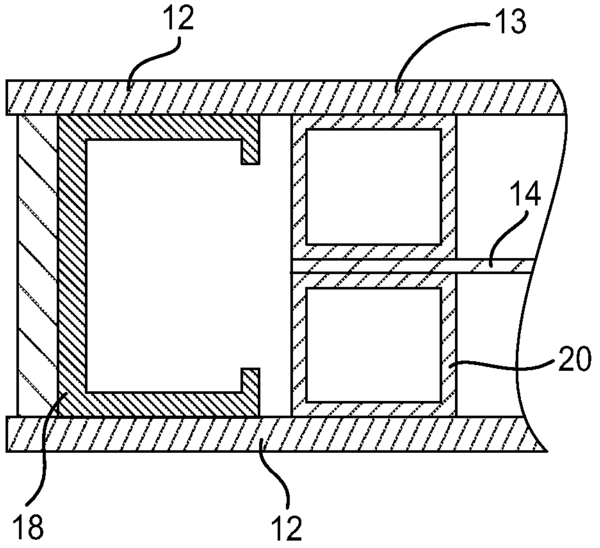
Figure 5C:
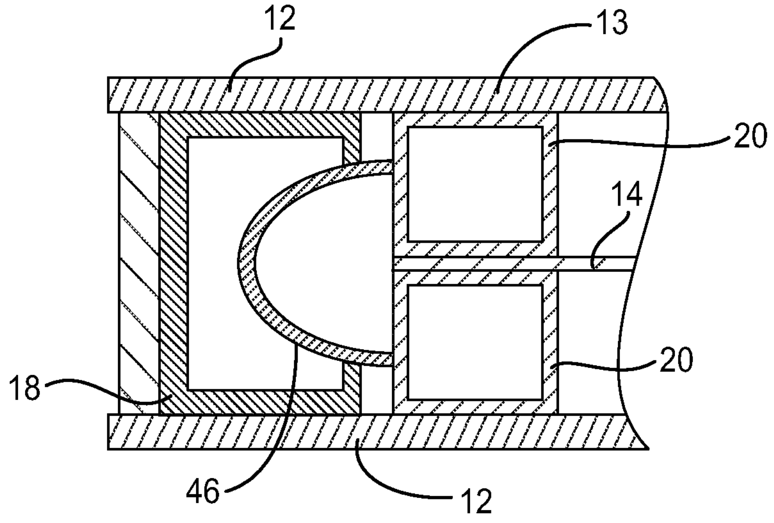

Reference is now made to FIGS. 5A-5C which show various arrangements for securing the support structure 20 to the edge spacer 18. FIG. 5A illustrates an arrangement wherein the frame 20 holding the film 14 is positioned interior and/or inside the edge spacer 18. FIG. 5B illustrates an arrangement wherein the frame holding the film 14 is dropped in the unit 10 such that it is outside of the edge spacer 18 and interior to the vision area 13 of the unit 10. FIG. 5C illustrates yet another arrangement wherein the frame 20 holding the film 14 is located interior to vision area 13, but is snapped into edge spacer 18 with clips 6.

The film 14 can be annealed prior to or after being secured to the support structure. The film 14 is annealed to a relaxed state wherein the relaxed state of the film 14 has a tension of less than or equal to 0.1 lb. per linear inch.

The film 14 can be formed from at least one of a polymeric sheet, a thin glass sheet, and/or any other transparent sheet. The polymeric sheet can comprise a reinforced organic material. According to one embodiment, the film 14 can be a polymeric sheet comprising polyethylene terephthalate (PET). The PET film 14 can have a thickness 0.5-10 mil, 0.5-5 mil, or even 0.5-2 mil. At least one surface of the film 14 can include a low-e coating. It has been found that the insulated glass unit 10 of the present invention can achieve a much greater thermal performance than prior art arrangements by including low-e coatings on the glass panes 12*a*, 12*b* and/or the film 14 on one or more surfaces. In particular, it has been found that the unit 10 of the invention can have an R5 performance with lower cost Argon (Ar) and across a broader range of overall thickness and a R9 or better performance with Krypton (Kr) gas.

According to one embodiment, an adhesive 22 can be used to secure the film 14 to the support structure 20, as shown in FIG. 4C. Alternatively, an adhesive can be used to secure the film 14 to the edge spacer 18 (not shown). The adhesive 22 can be any known adhesive including a contact adhesive, a pressure sensitive adhesive, a UV curable adhesive, a thermally cured adhesive, or a chemically cured adhesive. According to yet another embodiment, the film 14 can be secured to the edge spacer 18 with the primary sealant 16. According to still another embodiment, the film can be heated to melt and bond with the support structure 20 or edge spacer 18 without the need for an adhesive or sealant.

According to one embodiment and with reference to FIGS. 6A, 6B, 7A, 7B, 8A, and 8B, the film 14 can be secured to the support structure 20 or the at least one edge spacer 18 by the use of a mechanical member. The support structure 20 can include a pair of frames 20*a*, 20*b* in which the film is sandwiched therebetween. According to one embodiment, the frames 20*a*, 20*b* are held together at the corners with keys or other mechanical fixtures or joining structures (not shown) such as a dove-tail, adhesive covering at least a portion of the side member, and a transparent panel adhered to the side-member by an adhesive. Another arrangement can include the support frames 20*a*, 20*b* having corners that are fabricated using a notch in the side and then folding of that side to form the corner, adhesive covering at least a portion of the side-member, and the transparent film 14 adhered to the side by an adhesive. According to still another embodiment, it has been found that using frames without corner grips allows for extra room for the film and prevents the film from cramping up in the corner and forming wrinkles in the film.

The film 14 can be attached to the pair of frames 20*a*, 20*b* with mechanical clips or other fixtures. The mechanical securement of the film 14 can be achieved using key/lock profiled pair of frames as described below.

Figure 6A:
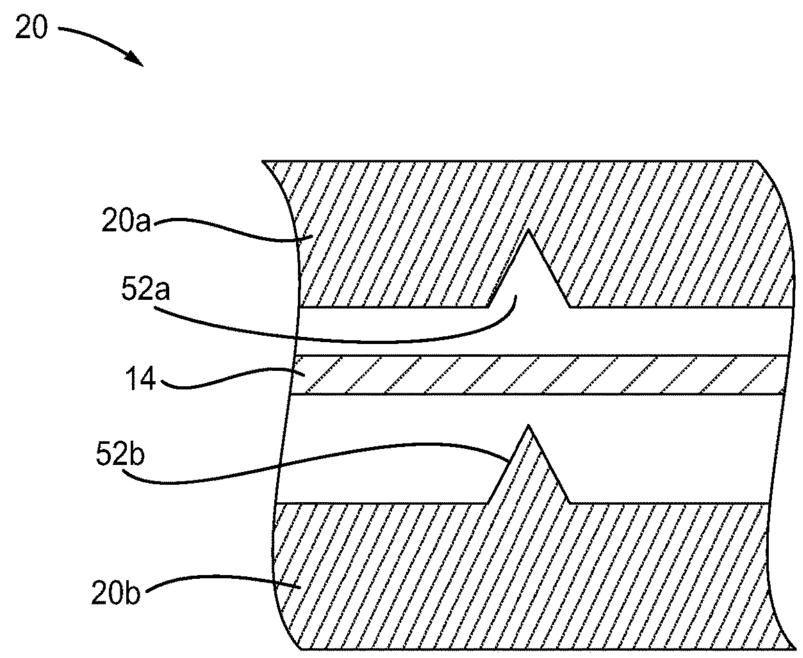
FIG. 6A is a cross-sectional partial side view of the frame/third pane in accordance with an embodiment of the invention.
Figure 6B:
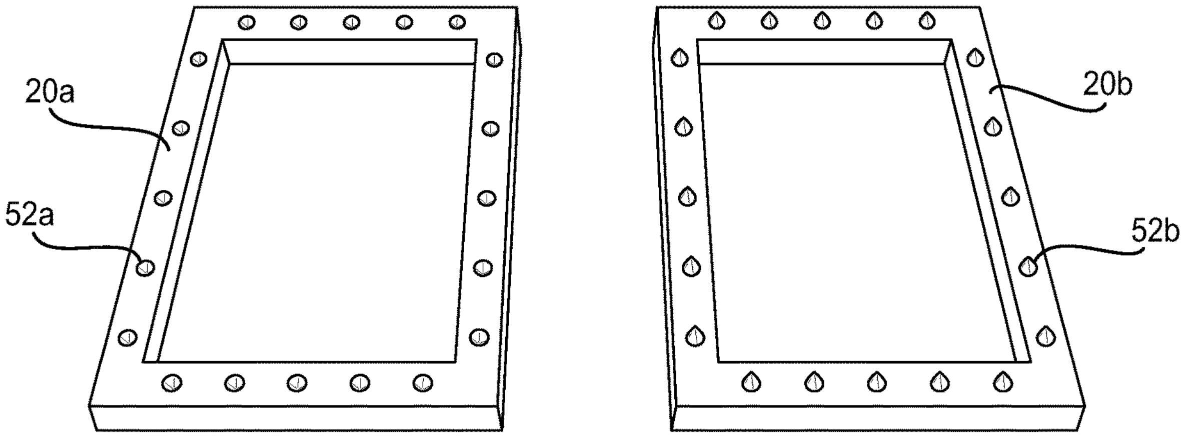
FIG. 6B is a perspective view of the frame of FIG. 6A in accordance with an embodiment of the invention.
Figure 7A:
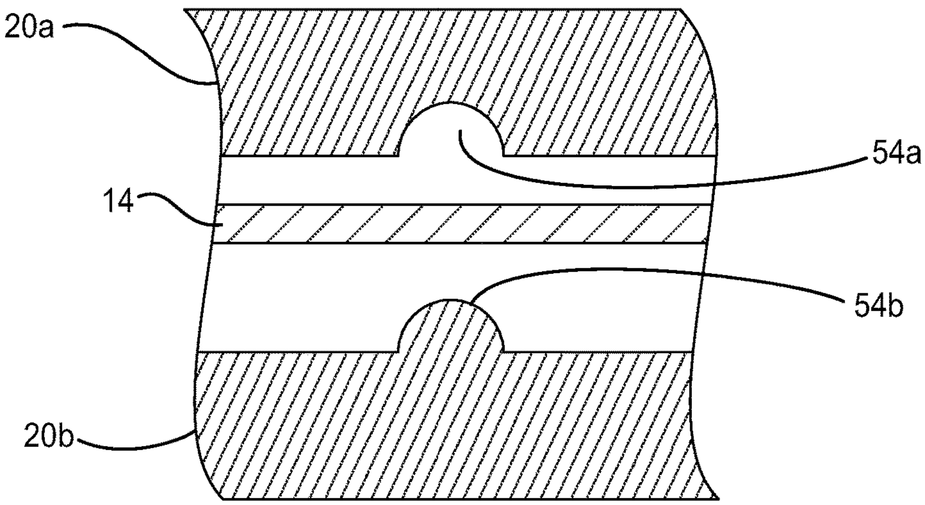
FIG. 7A is a cross-sectional partial side view of the frame/third pane in accordance with an embodiment of the invention.
Figure 7B:
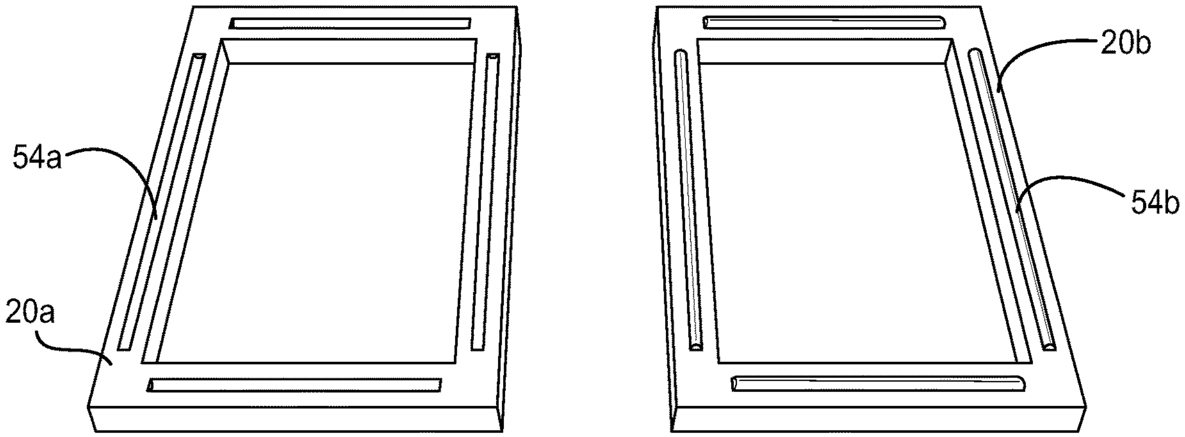
FIG. 7B is a perspective view of the frame of FIG. 6A in accordance with an embodiment of the invention.
Figure 8A:
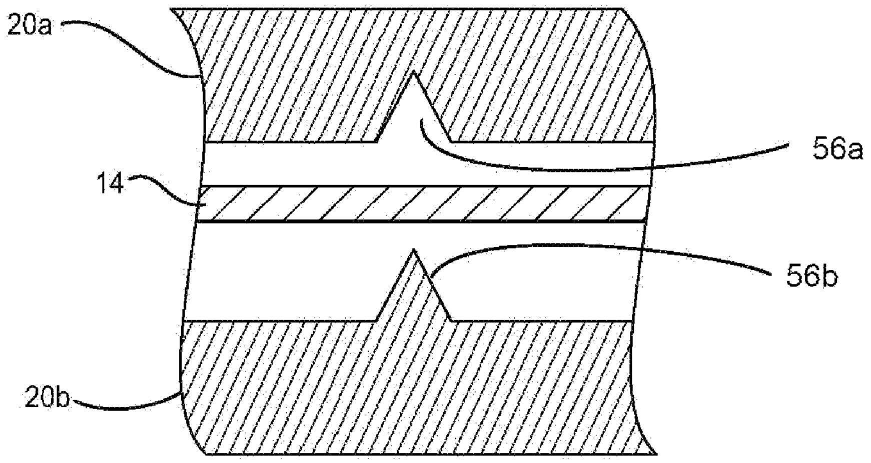
FIG. 8A is a cross-sectional partial side view of frame/third pane in accordance with an embodiment of the invention.
Figure 8B:
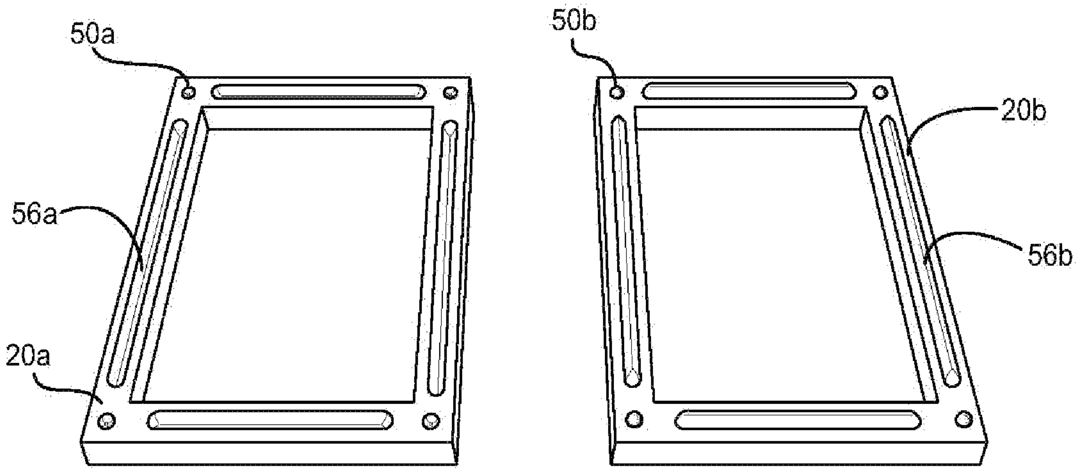
FIG. 8B is a perspective view of the frame of FIG. 6A in accordance with an embodiment of the invention.

For example, as shown in FIGS. 6A and 6B, the key/lock members can be a plurality of cone-shaped discrete members 52*a*, 52*b* running along the edges of the frame members 20*a*, 20*b*, which are configured to mechanically mate with the film 14 located therebetween. FIGS. 7A and 7B show a series of key/lock rod-shaped rounded members or parallelograms 54*a*, 54*b* extending along the length of the edges of the frame members 20*a*, 20*b*. FIGS. 8A and 8B show a series of key/lock rod-shaped cone members 56*a*, 56*b* extending along the length of the edges of the frame members 20*a*, 20*b*.

Figure 9A:
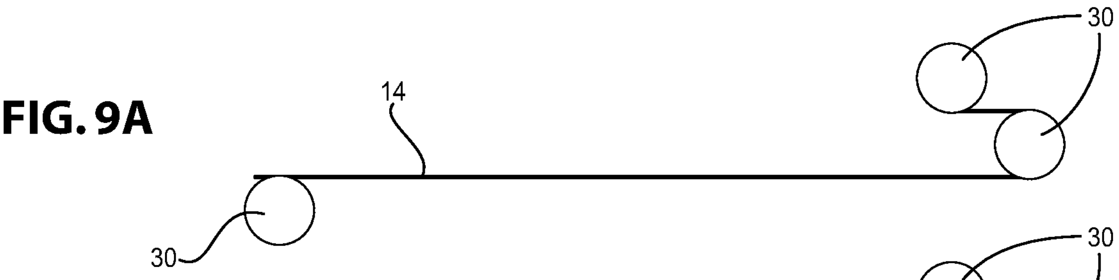
FIGS. 9A-9D show the steps of securing the third pane to the support structure in accordance with an embodiment of the invention.
Figure 9B:
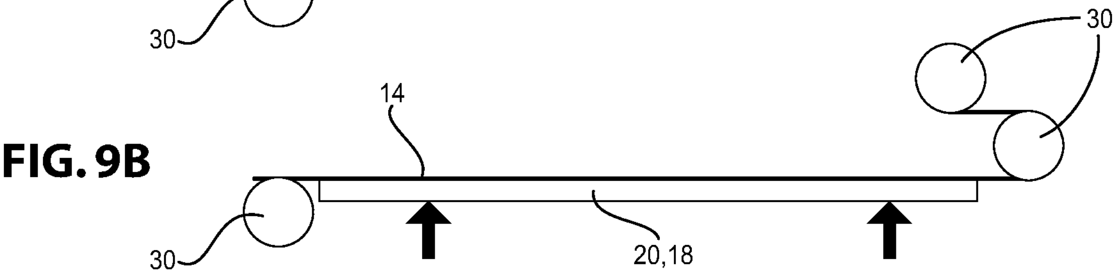
Figure 9C:
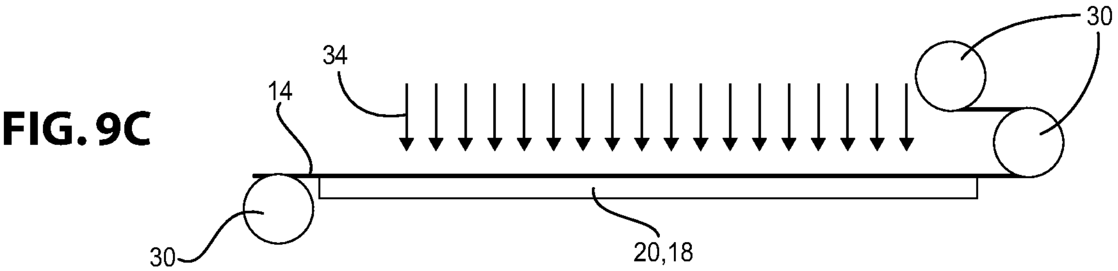
Figure 9D:
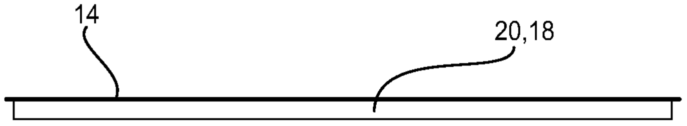

With continuing reference to FIGS. 2 and 3 and with further reference to FIGS. 9A-9D, the method for forming the insulating glass unit 10 comprises providing the pair of glass panes 12*a*, 12*b* in a parallel, spaced apart relation. Providing at least one film 14 and stretching the film, as shown in FIG. 9A, through the use of bowed roll, vacuum roll, or nip roll type wrinkle removal systems 30 or any other anti-wrinkle system, to remove wrinkles. This process typically takes less than 1 minute to complete. The next step in the process, as shown in FIG. 9B comprises securing the film 14 to either the support structure 20 or at least one edge spacer 18. This step requires a few seconds to complete. As shown in FIG. 9C, heat, as shown by arrows 34, is applied to anneal the film 14 to a relaxed state, as shown in FIG. 9D. Although FIG. 9C shows the application of heat to the film 14 after it has been secured to the support structure 20 or the at least one edge spacer 18, it can be appreciated that the annealing of the film 14 can occur prior to the film being secured to the support structure 20 or the at least one edge spacer 18. This annealing step can be accomplished in a few minutes, depending upon the material used to form the film 14. After annealing, the film 14 is positioned between the pair of glass panes 12*a*, 12*b* such that the film 14, with or without a support structure 20, is positioned in a spaced apart parallel relationship between the pair of glass panes 12*a*, 12*b*. At least one edge spacer 18 and a primary sealant 16 is provided between adjacent edges of the pair of panes 12*a*, 12*b*, to provide an integral sealed unit 10 defining a space 15 therebetween. It can be appreciated that the steps 9A-9D can be performed on a machine with articulated motion whereby any or all of the steps can be done automatically.

According to one embodiment, the film 14 can be secured directly to the at least one edge spacer 18. Alternatively, the film 14 can be secured to the support structure 20 and the film 14 and support structure 20 are positioned between the pair of glass panes 12*a*, 12*b* at a location that is separate from the at least one edge spacer 18, such as at a location that is interior to the vision area of the unit 10.

The support structure 20 can comprise at least one flexible frame member 20*a* located adjacent an edge of the film 14 or a pair of flexible frame members 20*a*, 20*b* sandwiching an edge of the film 14. According to one embodiment, the support structure 20 can comprise at least one frame member 20*a* located adjacent an edge of the film 14, wherein the at least one frame member 20*a* is flexible and has a thickness large enough so it would not lose, or rather maintain its shape under its weight. According to one embodiment, an approximate 1/16" thick aluminum frame can be used. The frames 20*a*, 20*b* can be formed using any known method including a molding process, stamping process, 3-D printing process, and the like.

The film 14 can be heated to a temperature and for a time sufficient to cause stress induced crystallization such that the relaxed state of the film 14 has a tension of less than or equal to 0.1 lb. per linear inch.

The method further comprises trimming the film 14 after it is annealed to the relaxed state and secured to one of the support structure 20 and the at least one edge spacer 18. The film 14 can be trimmed using a knife, blade, laser, and the like. The film 14 can be secured to one of the support structure 20 and the at least one edge spacer 18 by at least one of a mechanical member, an adhesive, and a thermoplastic welding process.

It can be appreciated that the film 14 can also include at least one of materials embedded therein or coated on one or both sides to control transmission and/or reflection spectra. A pattern can be printed on the film 14 either before or after the film 14 is affixed to the support structure 20 or the spacer 18. The film 14 can be coated with or have an aesthetic material applied to the portion visible to the end user allowing for additional designs which would be visually appealing to the end user. At least one surface of the film 14 can include a low-e coating. According to one embodiment, the optical haze of unit 10 can be less than 3% as measured by a BK Gardner Hazegard, and preferably less than 1.5% and preferably less than 1%.

The film 14 can also be configured to act as a sound generating member for production of e.g., music, noise cancelling acoustics, or white noise for obscuration of acoustic pickup by e.g., laser reflection of conversations within the room. The driving element can be either the film 14, itself (with appropriately placed electrodes) or with an attached transducer. The lack of rigid mechanical attachment to the spacer 18 by the center support structure 20 or spacer 18 allows for use of one or more middle films 14 to act as acoustic membranes without imparting the acoustic waves to the spacer 18 and reducing the potential for failure, and/or without imparting the acoustic waves to the building structure, so as to control the area and location of acoustic wave emission into the ambient.

Also, the film 14 can be designed to have a thermochromic function for passive control of the optical (visible and/or the IR regions) transmission and/or reflection spectra, either with materials embedded into the film 14 or by applying a coating on one or both surfaces 14*a*, 14*b*, of the film 14.

Figure 10A:
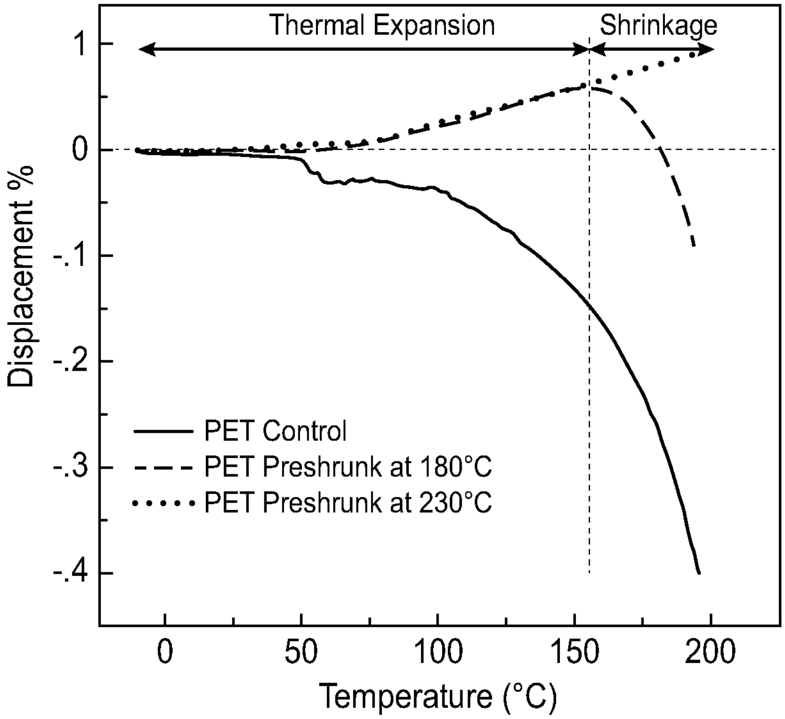
FIGS. 10A and 10B show graphs illustrating the optimal temperature determination for a pre-attachment heating with film shrinking vs. use of a pre-shrunk or low-shrink film in accordance with the invention.
Figure 10B:
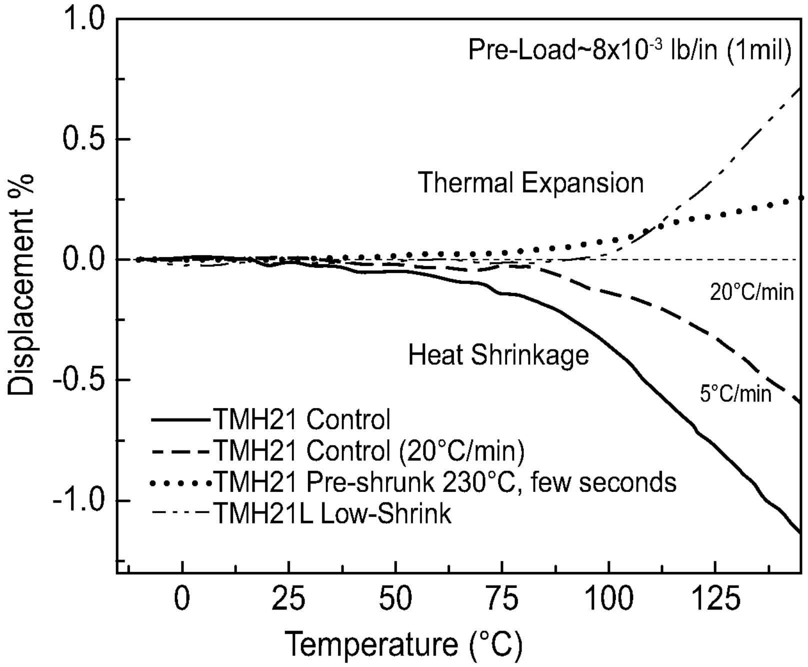

Reference is made to FIG. 10A, which shows the optimal temperature determination for pre-attachment heating (i.e, film shrink) step. FIG. 10B shows the temperature determination using a pre-shrunk or low-shrink film wherein a heat stabilized film is not required. The heat profile (i.e., temperature vs. time) is such that the film is wrinkle free and the stress is such that essentially no force is applied to the frame 20 of spacer 18.

Figure 11:
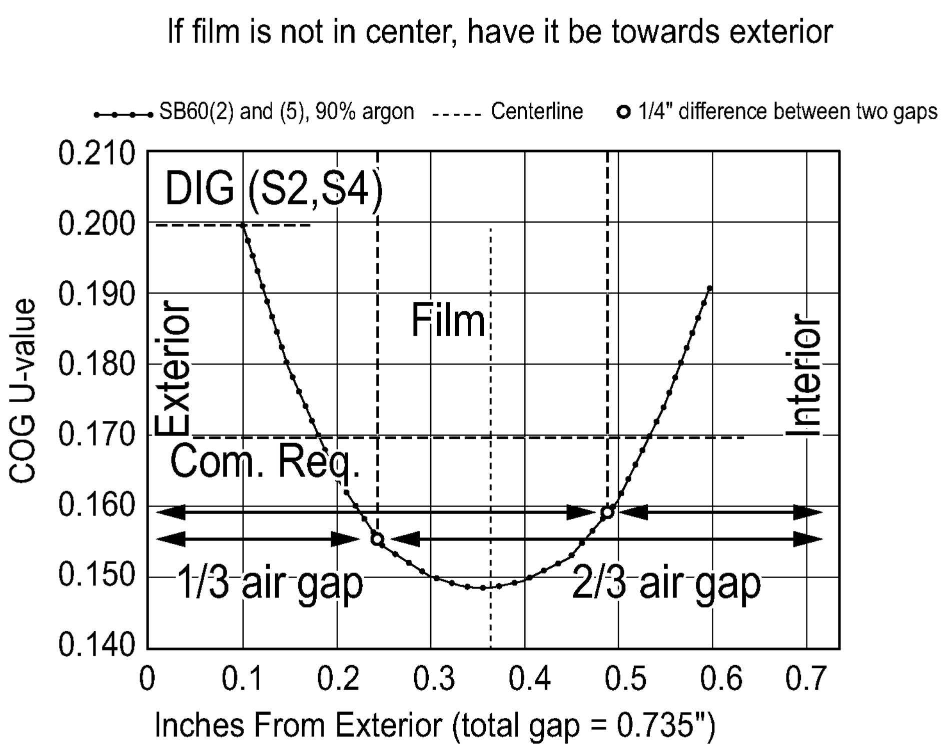
FIG. 11 is a graph showing an optical location for the center panel for the best thermal performance in accordance with a feature of the invention.
Figure 12A:
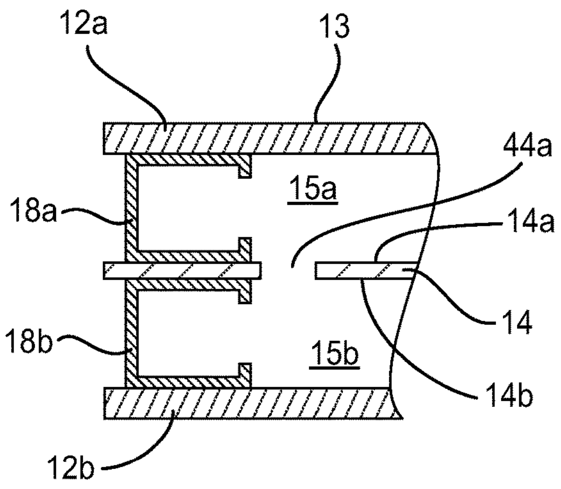
FIGS. 12A-12D are cross-sectional partial views showing various arrangements for pressure equalization between the panels of the multi-pane insulated glass unit in accordance with the invention.
Figure 12B:
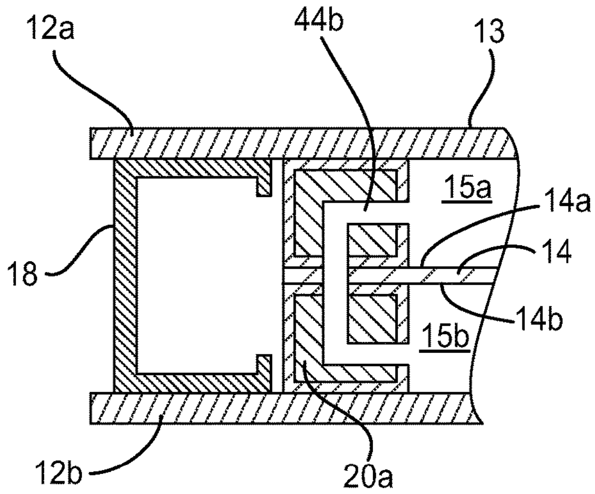
Figure 12C:
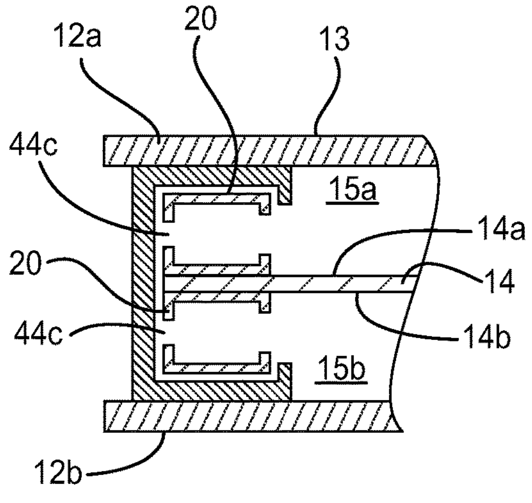
Figure 12D:
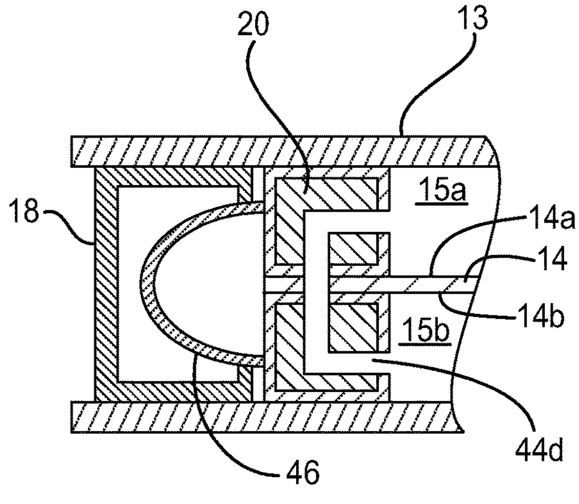

Reference is made to FIG. 11, which shows a graph depicting an optical location for the film 14 for the best thermal performance of the unit 10. As shown in FIG. 11, the best location for the film 14 is on the centerline between the inner surfaces of the outer glass panes 12*a*, 12*b*. However, as shown in FIG. 11, the film 14 can also be positioned at an offset location from the centerline or of the space 15 between the inner surfaces of the outer glass panes 12*a*, 12*b* and sill achieve improved thermal performance vs. a two panel insulated glazing unit.

With continuing reference to FIGS. 2-3 and 4A-4D and with further reference of FIGS. 12A-12D, the pair of glass panes 12 can comprise a first glass pane 12*a* and a second glass pane 12*b*. A space or first chamber 15*a* is located between the first glass pane 12*a* and a first side 14*a* of the film 14 and a space or second chamber 15*b* is located between the second glass pane 12*b* and a second side 14*b* of the film 14. An opening can be provided to allow for a gas to travel between the first chamber 15*a* and the second chamber 15*b* to ensure pressure equalization between the first chamber 15*a* and the second chamber 15*b*. In accordance with an embodiment shown in FIG. 12A, where the film 14 is integrated with spacers 18*a* and 18*b*, the opening 44*a* can be provided in the film 14. In the embodiment shown in FIG. 12B, where the film 14 is secured to a support structure 20 and the support structure 20 and film 14 are located interior to a vision area 13 of the unit 10, openings 44*b* can be provided in the support structure 20. In the embodiment shown in FIG. 12C, where the support structure 20 and the film 14 are located inside of the spacer 18, openings 44*c*, in the form of multiple openings, can be provided in the support structure 20. In the embodiment shown in FIG. 12D, the support structure 20 is secured interior to the vison area 13 of the unit 10 with clips 46 that cooperate with the spacer 18. In this embodiment, the opening 44*d* is provided in the support structure 20.

Figure 13A:
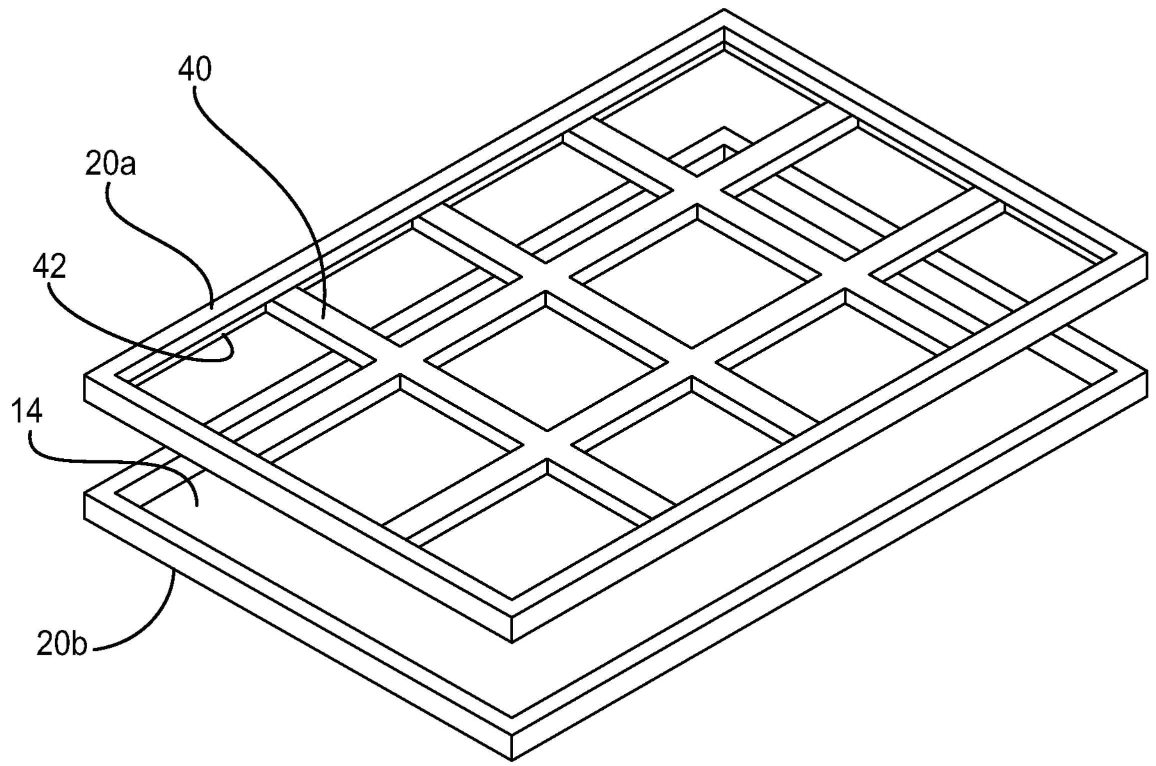
FIG. 13A shows a perspective view of a multi-pane insulated glass unit including muntins in accordance with an embodiment of the invention.
Figure 13B:
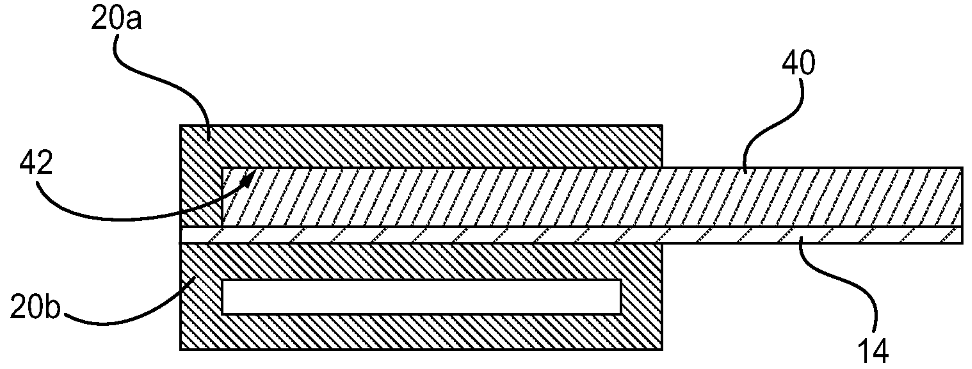
FIG. 13B shows a cross-sectional partial view of the multi-pane insulated glass unit of FIG. 13A in accordance with an embodiment of the invention.

Reference is now made to FIGS. 13*a*, and 13*b* which show muntins 40. The muntins 40 can be attached to either the edge spacer 18 (not shown) or the support structure/frame 20*a* or 20*b*, or both. The muntins 40 may be attached with or without clips. According to one arrangement, the muntins 40 can be inserted within a notch 42 within the upper frame 20*a* and the film 14 can be attached to the lower frame 20*b*. Alternatively, muntins 40 can be printed on the film.

The invention is further described in the following numbered clauses.

Clause 1: An insulating glass unit comprising: a pair of glass panes in a parallel, spaced apart relation; at least one edge spacer and at least a primary sealant located between adjacent edges of the pair of panes to provide an integral sealed unit defining a space therebetween; and at least one transparent film located within the space between the pair of glass panes, said at least one transparent film secured to one of a support structure and the at least one edge spacer, wherein the film is positioned in a spaced apart parallel relationship between the pair of glass panes, and wherein the film is annealed to a relaxed state prior to positioning of the film between the pair of glass panes.

Clause 2: The insulating glass unit of claim 1, wherein the at least one transparent film is supported by the support structure and the support structure is separate from the edge spacer.

Clause 3: The insulating glass unit of clause 2, wherein the support structure comprises at least one frame member located adjacent an edge of the film.

Clause 4: The insulating glass unit of clause 3, wherein the at least one frame member is flexible and has a thickness large enough so it would maintain its shape under its weight.

Clause 5: The insulating glass unit of clause 4, wherein the at least one frame member is aluminum having a thickness of approximately 1/16".

Clause 6: The insulating glass unit of any one of clauses 2-5, wherein the film is annealed prior to or after securing the film to the support structure.

Clause 7: The insulating glass unit of any one of clauses 1-6, wherein the relaxed state of the film has a tension of less than or equal to 0.1 lb. per linear inch.

Clause 8: The insulating glass unit of any one of clauses 1-7, wherein the film is heated to an annealing temperature of at least 70° C. for approximately ten minutes.

Clause 9: The insulating glass unit of any one of clauses 1-8, wherein the film comprises at least one of a polymeric sheet, a thin glass sheet, and any other transparent sheet.

Clause 10: The insulating glass unit of clause 9, wherein the film is a polymeric sheet comprising polyethylene terephthalate.

Clause 11: The insulating glass unit of any one of clauses 1-10, wherein the film is secured to the support structure or the at least one edge spacer by at least one of a mechanical member, an adhesive, the primary sealant, and by thermoplastic welding.

Clause 12: The insulating glass unit of clause 2, wherein the support structure is secured to the edge spacer.

Clause 13: The insulating glass unit of clause 2, wherein the pair of glass panes comprises a first glass pane and a second glass pane and wherein the support structure is configured to allow for a gas to travel between a first chamber located between the first glass pane and a first side of the film and a second chamber located between the second glass pane and a second side of the film to ensure pressure equalization between the first chamber and the second chamber.

Clause 14: The insulating glass unit of any one of clauses 1-13, wherein the film includes at least one of materials embedded therein or coated on one or both sides to control transmission and/or reflection spectra.

Clause 15: A method for forming an insulating glass unit comprising: providing a pair of glass panes in a parallel, spaced apart relation; providing at least one film; stretching the film to remove wrinkles; securing the film to one of a support structure and at least one edge spacer; applying heat to the film to anneal the film to a relaxed state, wherein the step of annealing the film occurs before or after the step of securing the film to one of the support structure and the at least one edge spacer; positioning the film secured to one of the support structure and the at least one edge spacer between the pair of glass panes such that the film is positioned in a spaced apart parallel relationship between the pair of glass panes; and providing the at least one edge spacer and a primary sealant between adjacent edges of the pair of panes to provide an integral sealed unit defining a space therebetween.

Clause 16: The method of clause 15, wherein the film is secured to the support structure and the film and support structure are positioned between the pair of glass panes at a location that is separate from the at least one edge spacer.

Clause 17: The method of clauses 15 or 16, wherein the support structure comprises at least one flexible frame member located adjacent an edge of the film.

Clause 18: The method of any one of clauses 15-17, wherein the film is heated to a temperature and for a time sufficient to cause stress induced crystallization such that the relaxed state of the film has a tension of less than or equal to 0.1 lb. per linear inch.

Clause 19: The method of any one of clauses 15-18, comprising trimming the film after it is annealed to the relaxed state and secured to one of the support structure and the at least one edge spacer.

Clause 20: The method of any one of clauses 15-19, wherein the film is secured to one of the support structure and the at least one edge spacer by at least one of a mechanical member, an adhesive, the primary sealant, and a thermoplastic welding process.

Clause 21: The method of any one of clauses 15-20, wherein the support structure comprises at least one frame member located adjacent an edge of the film, wherein the at least one frame member is flexible and has a thickness large enough so it would maintain its shape under its weight.

Clause 22: The method of clause 22, wherein the at least one frame member comprises aluminum having a thickness of approximately 1/16".

While the disclosure has been described as having exemplary designs, the present disclosure can be further modified within the spirit and scope of this disclosure. This application is, therefore, intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An insulating glass unit comprising:

a pair of glass panes in a parallel, spaced apart relation;

at least one edge spacer and at least a primary sealant located between internal facing adjacent edges of the pair of panes to seal the at least one edge spacer to the internal facing adjacent edges of the pair of panes to provide an integral sealed unit defining a space therebetween; and at least one annealed, relaxed transparent film located within the space between the pair of glass panes, said at least one transparent film secured to one of a support structure and the at least one edge spacer, wherein the film is free from wrinkles and is positioned in a spaced apart parallel relationship between the pair of glass panes, wherein the relaxed state of the film has a tension of less than or equal to 0.1 lb. per linear inch.

2. The insulating glass unit of claim 1, wherein the at least one transparent film is supported by the support structure and the support structure is separate from the edge spacer.

3. The insulating glass unit of claim 2, wherein the support structure comprises at least one frame member located adjacent an edge of the film.

4. The insulating glass unit of claim 3, wherein the at least one frame member is flexible and has a thickness large enough to maintain its shape under its weight.

5. The insulating glass unit of claim 2, wherein the support structure is secured to the edge spacer.

6. The insulating glass unit of claim 2, wherein the pair of glass panes comprises a first glass pane and a second glass pane and wherein the support structure is configured to allow for a gas to travel between a first chamber located between the first glass pane and a first side of the film and a second chamber located between the second glass pane and a second side of the film to ensure pressure equalization between the first chamber and the second chamber.

7. The insulating glass unit of claim 1, wherein the film is heated to an annealing temperature of at least 70° C. for approximately ten minutes.

8. The insulating glass unit of claim 1, wherein the film comprises at least one of a polymeric sheet, and a thin glass sheet.

9. The insulating glass unit of claim 8, wherein the film is a polymeric sheet comprising polyethylene terephthalate.

10. The insulating glass unit of claim 1, wherein the film is secured to the support structure or the at least one edge spacer by at least one of a mechanical member, an adhesive, the primary sealant, and by thermoplastic welding.

11. The insulating glass unit of claim 1, wherein the film includes at least one of materials embedded therein or coated on one or both sides to control transmission and/or reflection spectra.

12. An insulating glass unit comprising:

a pair of glass panes in a parallel, spaced apart relation;

at least one edge spacer and at least a primary sealant located between internal facing adjacent edges of the pair of panes to seal the at least one edge spacer to the internal facing adjacent edges of the pair of panes to provide an integral sealed unit defining a space therebetween; and at least one annealed, relaxed transparent film located within the space between the pair of glass panes, said at least one transparent film secured to one of a support structure and the at least one edge spacer, wherein the at least one transparent film is supported by the support structure and the support structure is separate from the edge spacer, the support structure comprising at least one frame member located adjacent an edge of the film, the at least one frame member being flexible and having a thickness large enough to maintain its shape under its weight, wherein the at least one frame member is a solid aluminum member having a thickness of approximately 1/16" across its width, and wherein the film is free from wrinkles and is positioned in a spaced apart parallel relationship between the pair of glass panes.

13. A method for forming an insulating glass unit comprising:

providing a pair of glass panes in a parallel, spaced apart relation;

providing at least one film;

stretching the film to remove wrinkles;

securing the film to one of a support structure and at least one edge spacer;

applying heat to the film to anneal the film to a relaxed state, wherein the step of annealing the film occurs before or after the step of securing the film to one of the support structure and the at least one edge spacer;

positioning the film secured to one of the support structure and the at least one edge spacer between the pair of glass panes such that the film is positioned in a spaced apart parallel relationship between the pair of glass panes; and providing the at least one edge spacer and a primary sealant between adjacent edges of the pair of panes to provide an integral sealed unit defining a space therebetween.

14. The method of claim 13, wherein the film is secured to the support structure and the film and support structure are positioned between the pair of glass panes at a location that is separate from the at least one edge spacer.

15. The method of claim 13, wherein the support structure comprises at least one flexible frame member located adjacent an edge of the film.

16. The method of claim 13, wherein the film is heated to a temperature and for a time sufficient to cause stress induced crystallization such that the relaxed state of the film has a tension of less than or equal to 0.1 lb. per linear inch.

17. The method of claim 13, further comprising trimming the film after it is annealed to the relaxed state and secured to one of the support structure and the at least one edge spacer.

18. The method of claim 13, wherein the film is secured to one of the support structure and the at least one edge spacer by at least one of a mechanical member, an adhesive, the primary sealant, and a thermoplastic welding process.

19. The method of claim 13, wherein the support structure comprises at least one frame member located adjacent an edge of the film, wherein the at least one frame member is flexible and has a thickness large enough to maintain its shape under its weight.

20. The method of claim 13, wherein the at least one frame member comprises aluminum having a thickness of approximately 1/16".

* * * * *